United States Patent [19]

Josserand

[11] Patent Number: 4,778,972
[45] Date of Patent: Oct. 18, 1988

[54] METHOD AND APPARATUS FOR REPEATEDLY AND AUTOMATICALLY THREADING THE WIRE ELECTRODE OF AN EDM APPARATUS

[75] Inventor: Joseph Josserand, Cruseilles, France

[73] Assignee: Charmilles Technologies S.A., Geneva, Switzerland

[21] Appl. No.: 102,813

[22] Filed: Sep. 22, 1987

Related U.S. Application Data

[63] Continuation-in-part of Ser. No. 879,818, Jun. 27, 1986, abandoned.

[30] Foreign Application Priority Data

Jun. 28, 1985 [CH] Switzerland .......................... 2762/85

[51] Int. Cl.4 .............................................. B23H 7/02
[52] U.S. Cl. .................................. 219/69 W; 204/206
[58] Field of Search ............... 219/69 W, 69 M, 69 R; 204/206, 224 M; 140/139, 140

[56] References Cited

U.S. PATENT DOCUMENTS

| | | | |
|---|---|---|---|
| 3,912,899 | 10/1975 | Lehmann et al. | 219/69 W |
| 4,367,392 | 1/1983 | Girardin | 219/69 W |
| 4,427,870 | 1/1984 | Inoue | 219/69 W |
| 4,465,915 | 8/1984 | Corcelle | 219/69 W |
| 4,547,647 | 10/1985 | Schneider | 219/69 W |

FOREIGN PATENT DOCUMENTS

| | | | |
|---|---|---|---|
| 2809506 | 9/1979 | Fed. Rep. of Germany | 219/69 W |
| 141490 | 11/1979 | Japan | 219/69 W |
| 125944 | 9/1980 | Japan | 219/69 W |

Primary Examiner—A. D. Pellinen
Assistant Examiner—Geoffrey S. Evans
Attorney, Agent, or Firm—Gifford, Groh, VanOphem, Sheridan, Sprinkle and Dolgorukov

[57] ABSTRACT

A method and apparatus for automatically rethreading the electrode wire of a traveling wire EDM apparatus through a pair of close tolerance wire support and guide members, one disposed on one side of a workpiece and the other on the other side of the workpiece, and for threading the end of the wire through a starting aperture in the workpiece. Prior to threading or rethreading the wire, the wire is heated in a heating zone while a pull is exerted on the wire such as to elongate the heated portion of the wire to reduce its diameter. After cutting off the wire at the beginning of its reduced diameter portion, the reduced diameter portion of the wire is threaded through the wire guide members and the aperture in the workpiece. The threading of the wire is effected by a feed mechanism disposed upstream of the first wire guide member which preferably is the same mechanism as the brake mechanism effecting a pull on the wire during normal operation of the EDM apparatus.

31 Claims, 2 Drawing Sheets

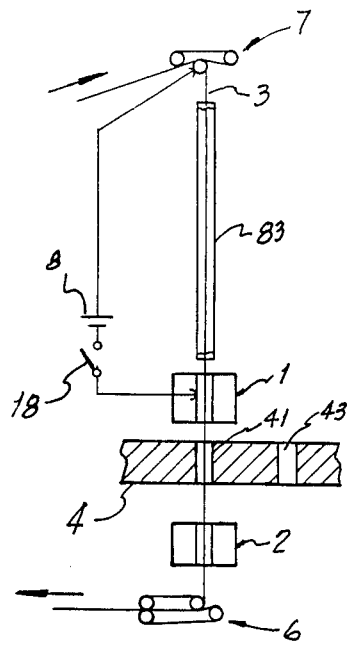
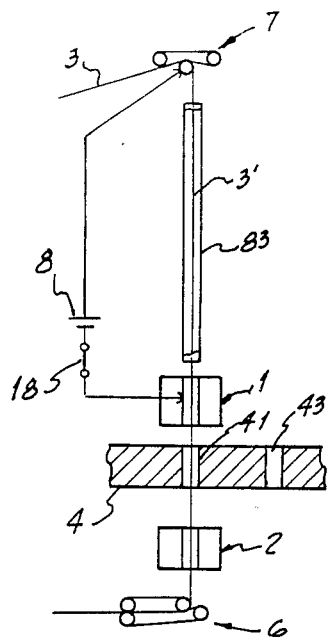
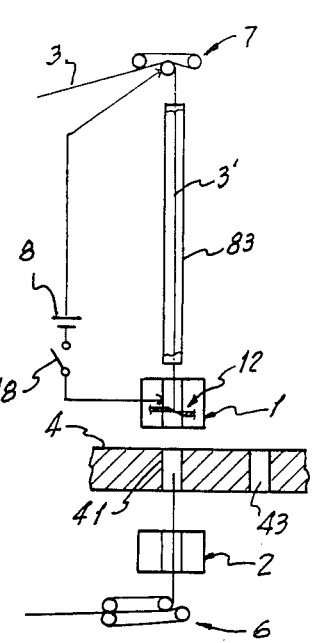
FIG. 2(a)  FIG. 2(b)  FIG. 2(c)
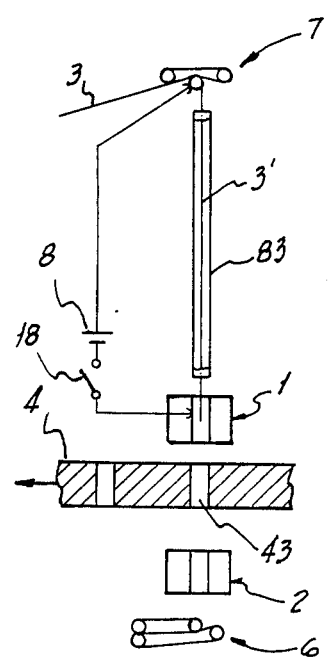
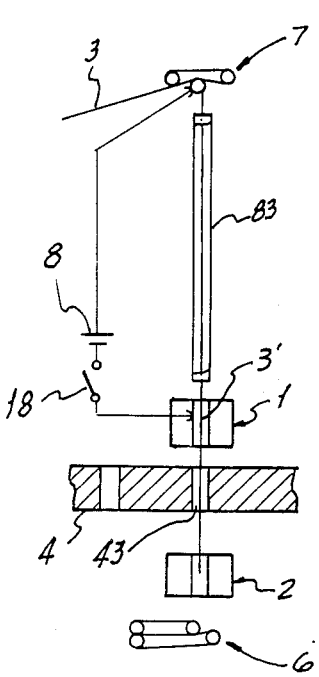
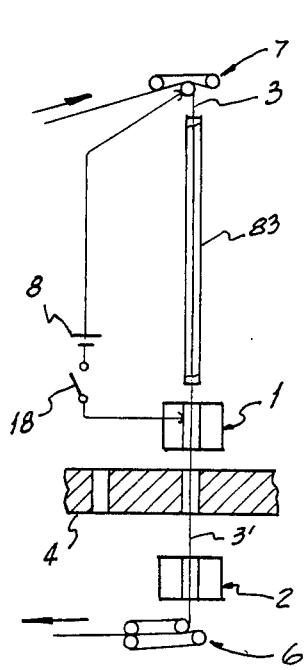
FIG. 2(d)  FIG. 2(e)  FIG. 2(f)

METHOD AND APPARATUS FOR REPEATEDLY AND AUTOMATICALLY THREADING THE WIRE ELECTRODE OF AN EDM APPARATUS

This is a continuation-in-part of application Ser. No. 879,818, filed 6-27-86, now abandoned.

BACKGROUND OF THE INVENTION

The present invention relates to a method and apparatus for repeatedly and automatically threading the wire electrode of an EDM apparatus through a workpiece.

When cutting a workpiece in a traveling wire EDM apparatus, some operations require that the electrode wire be removed from the cut being effected in the workpiece and rethreaded into another starting hole in the workpiece, the workpiece being appropriately positioned prior to each of the rethreading operations. Because the diameter of the electrode wire is very small, for example 250 microns, and is only slightly smaller than the bore diameter of the wire guide members, such bore diameter being, for example, 252 microns, which is a requirement for accurate positioning of the wire by its guide members, threading the wire through such a small bore, only 2 microns in diameter wider than the wire diameter, is a rather difficult accomplishment. This is particularly true if the threading of the wire through the wire guide members is automatic. Because the wire feed mechanism, displacing the wire along its longitudinal axis, is located outside of, and a certain distance away from the wire support and guide "heads", the electrode wire end, during threading and rethreading, must be passed from its free end over a considerable distance through the wire support and guide heads. If the clearance between the wire peripheral surface and the wire support and guide members is relatively narrow, considerable fricion results, and it is quite possible for the end of the electrode wire to hit some of the components in the wire support and guide heads and to become distorted to a point of not being capable of being correctly threaded, in spite of its inherent rigidity.

A few solutions to that problem have been proposed in the past, such as disclosed in Federal Republic of Germany published patent application No. 3,037,505 which discloses forming the electrode wire with a needle point prior to rethreading the wire. Such proposed solution to the problem, however, provides unsatisfactory results, in view of the close tolerance between the bore of the wire guide members and the size of the wire itself, which may lead to considerable resistance to threading the body of the wire through the wire guide members and other elements disposed in the wire support and guide heads.

SUMMARY OF THE INVENTION

The principal object of the invention is to provide a method and apparatus for uniformly reducing the diameter of the electrode wire of a traveling wire EDM apparatus, upstream of the wire upper support and guide heads, by heating and stretching the wire over a length which is at least equal to the working zone of the wire, the working zone of the wire being defined between the upper and the lower wire guide members, plus the distance from the lower wire guide member to the wire feeding mechanism normally effecting a pull on the wire for feeding the wire longitudinally through the machining zone formed between the active portion of the wire and the workpiece.

Another object of the invention is to effectuate the reduction in diameter of the wire while the wire is still being threaded through the workpiece, and to subsequently cut off the wire at the start of its section of reduced diameter, while the remaining wire downstream of the cut is disposed of by the wire feeding mechanism.

A further object of the present invention is to provide means for feeding the reduced diameter portion of the wire from above into the upper wire support and guide head, through an aperture in the workpiece and through the lower wire support and guide head, for rethreading the wire, until the end of the reduced diameter portion of the wire is caught by the wire feeding mechanism disposed below the workpiece.

Another object of the invention is to provide a heating and stretching zone for the wire which is preferably disposed within a conduit or channel completely surrounding the wire such as to insure uniform heating of the wire.

The diverse objects and advantages of the present invention will become apparent to those skilled in the art when the following description of an example of the best mode contemplated for practicing the invention is read in conjuction with the accompanying drawing, wherein:

BRIEF DESCRIPTION OF THE DRAWING

FIGS. 2(a)-2(f) illustrate consecutive steps in the rethreading operation of an electrode wire, according to the present invention.

DETAILED DESCRIPTION OF THE PREFERRED EMBODIMENT

Figure 1:
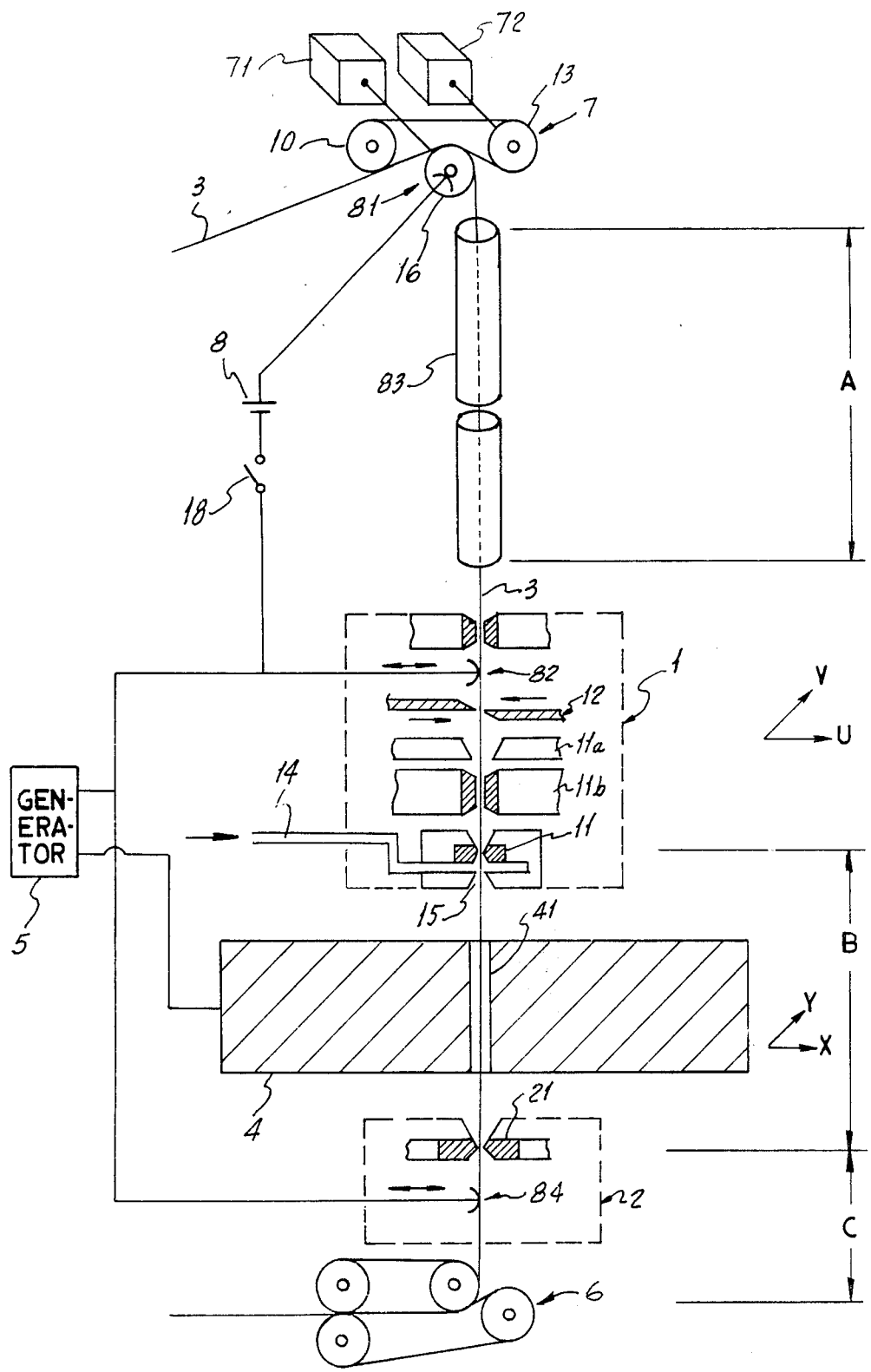
FIG. 1 is a schematic representation of a traveling wire EDM apparatus incorporating the present invention.

As schematically illustrated at FIG. 1, a traveling wire EDM apparatus comprises an upper electrode wire support and guide head 1 disposed on one side of a workpiece 4, and a lower electrode wire support and guide head 2 disposed below the workpiece 4. An electrode wire 3, obtained from a supply of wire such as a spool, or the like, not shown, is displaced longitudinally between the upper wire support and guide head 1 and the lower wire support and guide head 2, through a cut being effected in the workpiece 4, the electrode wire 3 being fed longitudinally and pulled by a motor driven wire feed conveyor 6 against the action of a braking mechanism generally designated at 7. The braking mechanism 7, in the example of structure illustrated, takes the form of a conveyor system comprising an endless belt 9 disposed between a first roller 10 and a second roller 13. The electrode wire 3 is passed between the belt 9 and a pressure roller 16. The pressure roller 16 is shaft-connected to a brake mechanism 71 such that a tension force is constantly exerted on the electrode wire 3, while being pulled longitudinally by the wire feed conveyor 6.

A pulse generator 5, as is well known in the art, is connected across the workpiece 4 and the electrode wire 3 by means of a first sliding contact 82 disposed in the upper wire support and guide head 1 and a second sliding contact 84 disposed in the lower wire support and guide head 2, to trigger electrical discharges and provide the power for the machining electrical discharges occurring in the machining zone 41 between the electrode wire 3 and the workpiece 4. A dielectric machining fluid such as water, oil or kerosene is injected into the machining zone 41 by a nozzle 15 supplied in machining fluid by a conduit 14.

The workpiece 4 is displaced along X- and Y-axes by being mounted on a cross-slide table driven by servo-motors under the control of an appropriate numerical control unit, none of which is shown, as is also well known in the art, for effecting an appropriate cut in the workpiece 4 along a pre-programmed path. One of the wire support and guide head, for example the upper head 1, is displaceable along crossed U- and V-axes, by appropriate means not shown, the plane of the U- and V-axes being generally parallel to the plane of the X- and Y-axes of displacement of the workpiece 4 relative to the electrode wire 3, for the purpose of inclining the electrode wire 3 for effecting an oblique cut in the workpiece 4, when required.

In order to provide accurate positioning of the electrode wire 3 while effecting a cut in the workpiece 4, the upper wire support and guide head 1 has a wire guide member 11, mounted above the nozzle 15, and the lower wire support and guide head 2 has a wire guide member 21. Each wire guide member 11 and 21 is a "closed" guide member preferably made of a precious stone, such as sapphire for example, having a through bore, and which is supported by a metallic support ring. The use of a precious stone permits to operate with great repetitive accuracy in the position of the electrode wire 3 as the precious stone is highly resistant to abrasion and wear. In order to further increase the accurate positioning of the longitudinal axis of the wire 3, the bore through the precious stone presents as narrow a clearance for the passage of the wire 3 through it as practical, such as to limit to a minimum the permissible lateral play of the wire 3 while passing through the wire guide members 11 and 21. For example, with an electrode wire 3 of 250 microns in diameter, the diameter of the bore through the wire guide members 11 and 21 is generally of the order of 252-253 microns.

At FIG. 1, the distance separating the upper wire guide member 11 from the lower wire guide member 21 is arbitrarily designated as a "working zone" of length B, and the distance separating the lower wire guide member 21 from the wire drive conveyor mechanism 6 has a length C. Between the wire brake mechanism 7 and the upper wire support and guide head 1, a heating zone of length A is provided as embodied by a tubular member 83 through which the electrode wire 3 is passed. The electrode wire 3, while passing through the tubular member 83, can be heated at will by means of an electrical current source 8 connected across the contact 82 bringing the machining pulses to the electrode wire 3 in the wire support and guide head 1 and another contact 81 in engagement with the electrode wire 3 at the roller 16 of the wire braking mechanism 7, when a switch 18 is closed.

There are many cutting operations effected by a traveling wire EDM apparatus in which the electrode wire 3 must be rethreaded through one or more starting holes pre-drilled through the workpiece 4. To effectuate such operations, the electrode wire 3 is first removed from the cut being effected in the workpiece 4, the workpiece 4 is displaced relative to the wire support and guide heads 1 and 2 such as to align another starting hole with the axis of the wire 3, and the wire 3 is rethreaded through the workpiece 4 and the lower wire support and guide head 2 until the end of the wire 3 is caught by the wire fed conveyor 6. Such sequence of operations is schematically illustrated at FIGS. 2(a)-2(f). At FIG. 2(a), there is illustrated a cutting operation being currently effected in the workpiece 4. At the end of the cut, and preparatory to threading the electrode wire 3 through a separate starting hole 43 in the workpiece 4, machining is stopped by shutting off the pulse generator 5, FIG. 1, while continuing to feed the electrode wire 3 through the cut by way of exerting a pull on the wire 3 by the wire feed conveyor 6, while braking the wire 3 by means of the brake mechanism 7. The switch 18 is closed, thus heating the wire 3 by way of circulating electrical current from the power source 8 through the wire 3 presently within the tubular member 83, which is preferably made of heat-insulating material. Preferably the wire 3 is heated red hot and a pull is exerted on the wire 3 such as to elongate it and, therefore, considerably reduce its diameter. While in the tubular member 83, the heated wire 3 is inculated from the ambient to avoid uneven heating of the wire 3 due to convection or localized air currents or drafts. The exerted pull can be applied to the wire 3 either during or after the application of heat to it. Preferably, in a continuous process such as the disclosed embodiment, the pull is exerted while the wire 3 is heated. Of course, the diameter of the wire can be reduced by an exerted pull at any time it is in a thermal state permitting a reduction of its diameter, for example, while still at an elevated temperature in an annealing zone (not shown), or otherwise at a sufficiently elevated temperature to allow the exerted pull to reduce the diameter of the wire 3.

Preferably, the length A of the heating zone, FIG. 1, which corresponds substantailly to the length of the tubular member 83, is more than the length of the "working zone" B, and a portion of the wire 3 which has been heated in the heating zone A and reduced in diameter defines the threading end portion 3', FIG. 2(b), of the wire. For example, if the electrode wire 3 has a diameter of 250 microns, its diameter is reduced to about 220 microns in the heating zone, and the threading section 3' of the wire 3 is substantially longer than the length of the working zone B and preferably longer than the total lengths B and C. The length of the threaded portion 3' of the wire 3 is thus definitely longer than the distance separating the wire guide members 11 and 21 and preferably longer than the distance separating the upper wire guide member 11 and the wire feed mechanism 6.

After the threading portion 3' of the electrode wire 3 has been formed, the electrode wire 3 is cut off at the leading section of the threading portion 3' by way of a cutter 12, FIGS. 1 and 2(c), while heat is no longer supplied to the wire by opening the switch 18. The cutter 12 is preferably characterized in being of the type File Wrapper Continuation of Ser. No. 879,818—Page 5 adapted to cut the wire 3 without forming any burr or edge on the end of the wire 3, and without changing the cross-sectional shape of the wire 3 because of such cutting. Cutting off the wire stops the longitudinal motion of the wire 3 upstream of the wire cutter 12, while the wire conveyor 6 disposes of the cut-off portion of the wire 3 downstream of the wire cutter 12.

The workpiece 4 is then displaced relative to the wire support and guide heads 1 and 2 such as to align the starting hole 43 with the wire support and guide heads 1 and 2, FIG. 2(d). The electrode wire 3, and more particularly the threading section 3' of the wire, is now ready to be threaded through the starting hole 43. The threading operation is initiated by activating the servomotor 72 that is coupled to the drive roller 13 of the wire brake mechanism 7, which now functions as a wire feed mechanism pushing the end of the wire threading portion 3' beyond the wire cutter 12 in the wire support and guide head 1 and through the wire guide member 11, FIG. 2(d). Directing and centering the threading portion 3' of the wire 3 towards the central bore in the wire guide member 11 may be facilitated by auxiliary tapered and funnel-shaped wire guide members 11a and 11b and by providing the inlet of the bore in the precious stone wire guide 11 with a taper or funnel shape. After the end of the wire threading portion 3' has been pushed beyond the upper wire guide member 11, the flow of the fluid through the nozzle 15 is turned on such as to provide a stream that is aimed towards the starting hole 43 in the workpiece 4 and which tends to guide and drive the end of the wire 3 substantially consecutively to the nozzle 15, the jet stream and the starting hole 43 in the workpiece 4, FIGS. 1 and 2(e). The wire 3 is continuously pushed by the wire brake feed mechanism 7 through the starting hole 43 and through the lower wire guide member 21 which, in order to facilitate threading of the wire 3 threading portion through the bore therein, may be provided with a tapered or funnel-shaped bore inlet, until the end of the wire 3 engages the conveyor mechanism 6, at which time the wire 3 is fed longitudinally by being pulled by the wire feed conveyor 6 while simultaneously the wire brake feed mechanism 7 is returned to its usual braking function by shutting off the drive servomotor 72 and energizing the brake 71.

During the wire heating and stretching step, the wire cut-off step and the wire threading step, the pulse generator 5 is automatically turned off. After the electrode wire 3 has been rethreaded through the upper wire support and guide head 1, the starting hole 43 in the workpiece 4, and the lower wire support and guide head 2, and as soon as the wire 3 is again traveling longitudinally after being engaged with and pulled by the wire feed conveyor 6, the pulse generator 5 may be turned on and a new cutting operation effected in the workpiece 4.

It will be appreciated by those skilled in the art that the electrode wire 3 may be originally threaded through the first starting hole in the workpiece 4 either manually, or automatically. Manual threading is effected in a conventional manner by manually passing the end of the electrode wire 3 through the upper support and guide head 1, the contact 82 being retracted, through the starting hole in the workpiece 4 and through the lower support and guide head 2, the contact 84 being retracted until the end of the electrode wire 3 projects into the inlet of the wire feed conveyor 6. Automatic threading through the first starting hole in the workpiece 4 can be effected by threading the electrode wire 3 manually through the upper and lower wire support and guide heads 1 and 2, outside of the perimeter of the workpiece 4, and initiating an automatic "dry run" from the wire heating step of FIG. 2(b) through the wire cutting step of FIG. 2(c), the wire threading steps of FIGS. 2(d) and 2(e), and the cut-ready step of FIG. 2(f). Such a preliminary "dry run" under the supervision of the machine operator presents the advantage of verifying the accuracy of the set-up and proper operation of the apparatus of the invention.

Having thus described the present invention by way of an example of method for rethreading the electrode wire of a traveling wire EDM apparatus and of a structure for practicing the invention, modifications whereof will be apparent to those skilled in the art, what is claimed as new is as follows:

1. In a traveling wire EDM apparatus having first closed wire support and guide means on one side of a workpiece and second closed wire support and guide means on the other side of the workpiece, the improvement comprising a wire heating zone upstream of said first wire support and guide means, means for exerting a pull on said wire for feeding said wire longitudinally and means for exerting a braking force on said wire for stretching said wire and significantly reducing its diameter said heating zone having a length exceeding the distance between said first and second wire support and guide means.

2. The improvement of claim 1 wherein the length of said heating zone is at least equal to the distance separating the first support and guide means and the means for exerting a pull on the wire.

3. The improvement of claim 1 wherein said heating zone is enclosed for insuring uniform heating of the wire and is aligned with said first and second guide means such that the reduced diameter portion of said wire is directly fed into said first and second guide means.

4. The improvement of claim 2 wherein said heating zone is enclosed for insuring uniform heating of the wire.

5. The improvement of claim 1 further comprising wire cut-off means associated with said first wire support and guide means for cutting off the wire substantially at a leading end of a portion reduced in diameter in said heating zone.

6. The improvement of claim 2 further comprising wire cut-off means associated with said first wire support and guide means for cutting off the wire substantially at a leading end of a portion reduced in diameter in said heating zone.

7. The improvement of claim 3 further comprising wire cut-off means associated with said first wire support and guide means for cutting off the wire substantially at a leading end of a portion reduced in diameter in said heating zone.

8. The improvement of claim 4 further comprising wire cut-off means associated with said first wire support and guide means for cutting off the wire substantially at a leading end of a portion reduced in diameter in said heating zone.

9. The improvement of claim 5 wherein said zone means for exerting a braking force on said wire comprises means for feeding the wire longitudinally for threading the wire through the first wire support and guide means, an aperture in the workpiece and the second wire support and guide means, said means for feeding the wire longitudinally being operable after said wire has been reduced in diameter and cut off.

10. The improvement of claim 6 wherein said means for exerting a braking force on said wire comprises means for feeding the wire longitudinally for threading the wire through the first wire support and guide means, an aperture in the workpiece and the second wire support and guide means, said means for feeding the wire longitudinally being operable after said wire has been reduced in diameter and cut off.

11. The improvement of claim 7 wherein said means for exerting a braking force on said wire comprises means for feeding the wire longitudinally for threading the wire through the first wire support and guide means, an aperture in the workpiece and the second wire support and guide means, said means for feeding the wire longitudinally being operable after said wire has been reduced in diameter and cut off.

12. The improvement of claim 8 wherein said means for exerting a braking force on said wire comprises means for feeding the wire longitudinally for threading the wire through the first wire support and guide means, an aperture in the workpiece and the second wire support and guide means, said means for feeding the wire longitudinally being operable after said wire has been reduced in diameter and cut off.

13. The improvement of claim 5 further comprising means associated with said first wire support and guide means for directing a jet of fluid toward an aperture in the workpiece.

14. The improvement of claim 6 further comprising means associated with said first wire support and guide means for directing a jet of fluid toward an aperture in the workpiece.

15. The improvement of claim 7 further comprising means associated with said first wire support and guide means for directing a jet of fluid toward an aperture in the workpiece.

16. The improvement of claim 8 further comprising means associated with said first wire support and guide means for directing a jet of fluid toward an aperture in the workpiece.

17. The improvement of claim 9 further comprising means associated with said first wire support and guide means for directing a jet of fluid toward said aperture in the workpiece.

18. The improvement of claim 10 further comprising means associated with said first wire support and guide means for directing a jet of fluid toward said aperture in the workpiece.

19. The improvement of claim 11 further comprising means associated with said first wire support and guide means for directing a jet of fluid toward said aperture in the workpiece.

20. The improvement of claim 12 further comprising means associated with said first wire support and guide means for directing a jet of fluid toward said aperture in the workpiece.

21. The improvement of claim 1 comprising braking force exerting means for stretching said wire and significantly reducing its diameter during heating of said wire.

22. The improvement of claim 1 comprising braking force exerting means for stretching said wire and significantly reducing its diameter after heating of said wire.

23. The improvement of claim 5 wherein said wire cut-off means is adapted to cut said wire without forming any burror edge on the end of said wire.

24. The method of threading the electrode wire of a traveling wire EDM apparatus wherein the electrode wire is traveling longitudinally through a working zone defined between a first wire guide member disposed on one side of a workpiece in which a cut is effected by electrical discharges between said electrode wire and the workpiece and a second wire guide member disposed on the other side of the workpiece, said method comprising uniformly reducing the diameter of the wire upstream of the working zone by heating the wire and exerting a pull on the wire over a length which is at least equal to the length of the working zone, said exerted pull being sufficient to significantly reduce said diameter of said wire over said length, cutting the wire at a point corresponding substantially to the beginning of the portion thereof of reduced diameter, and feeding the reduced diameter portion of said wire through the first wire guide member, an aperture in the workpiece, and the second wire guide member.

25. The method of claim 24 wherein the reduction in diameter of the wire is effected over a length at least equal to the length of the working zone and the distance between the second wire guide member and a wire feeding mechanism disposed beyond the second wire guide member.

26. The method of claim 24 wherein the feeding of the wire through an aperture in the workpiece is aided by a jet of fluid directed toward the aperture in the workpiece.

27. The method of claim 25 wherein the feeding of the wire through an aperture in the workpiece is aided by a jet of fluid directed toward the aperture in the workpiece.

28. The method of claim 24 wherein said reduction in diameter of the wire is accomplished by heating the wire upstream of the first wire guide member while exerting a pull on the wire in one direction by means of a wire feeding mechanism disposed beyond the second wire guide member and in an opposite direction by means of a wire braking mechanism.

29. The method of claim 24 wherein said significant reduction in diameter is at least 10 percent.

30. The method of claim 24 wherein said exerted pull is applied during heating of said wire.

31. The method of claim 24 wherein said exerted pull is applied after heating of said wire.

* * * * *